United States Patent
Huang et al.

(10) Patent No.: US 9,743,073 B2
(45) Date of Patent: Aug. 22, 2017

(54) IMAGE PROCESSING DEVICE WITH IMAGE COMPENSATION FUNCTION AND IMAGE PROCESSING METHOD THEREOF

(71) Applicant: DIVA LABORATORIES, LTD., New Taipei (TW)

(72) Inventors: Kuo-Sung Huang, New Taipei (TW); Shih-Pang Wang, New Taipei (TW)

(73) Assignee: Diva Laboratories, Ltd., New Taipei (TW)

(*) Notice: Subject to any disclaimer, the term of this patent is extended or adjusted under 35 U.S.C. 154(b) by 153 days.

(21) Appl. No.: 14/944,963

(22) Filed: Nov. 18, 2015

(65) Prior Publication Data

US 2016/0329027 A1 Nov. 10, 2016

(30) Foreign Application Priority Data

May 7, 2015 (TW) .............................. 104114547 A

(51) Int. Cl.
| | | |
|---|---|---|
| *H04N 13/04* | (2006.01) | |
| *H04N 9/68* | (2006.01) | |
| *H04N 9/67* | (2006.01) | |
| *H04N 9/73* | (2006.01) | |
| *G09G 3/20* | (2006.01) | |
| *G09G 5/02* | (2006.01) | |
| *G09G 3/36* | (2006.01) | |

(52) U.S. Cl.
CPC ....... *H04N 13/0422* (2013.01); *G09G 3/2003* (2013.01); *G09G 5/02* (2013.01); *H04N 9/67* (2013.01); *H04N 9/68* (2013.01); *H04N 9/73* (2013.01); *G09G 3/3607* (2013.01); *G09G 2320/0242* (2013.01); *G09G 2320/0276* (2013.01); *G09G 2320/0285* (2013.01); *G09G 2320/0295* (2013.01); *G09G 2320/0626* (2013.01); *G09G 2320/0666* (2013.01); *G09G 2320/0693* (2013.01); *G09G 2340/06* (2013.01)

(58) Field of Classification Search
CPC ................. G09G 2320/0242; G09G 2320/041
See application file for complete search history.

(56) References Cited

U.S. PATENT DOCUMENTS

2007/0247647 A1* 10/2007 Pettigrew .............. G06T 11/001
358/1.9
2012/0105604 A1* 5/2012 Lim ....................... H04N 17/04
348/51

OTHER PUBLICATIONS

Colorimetric calibration in electronic imaging devices using a look-up-table model and interpolations, Po-Chieh Hung, Journal of Electronic Imaging 2(1), 53-61 (Jan. 1993).*

* cited by examiner

*Primary Examiner* — Kee M Tung
*Assistant Examiner* — Grace Q Li
(74) *Attorney, Agent, or Firm* — Muncy, Geissler, Olds & Lowe, P.C.

(57) ABSTRACT

An image processing device includes an equation establishing unit, a calculating unit, a determining unit, a color space transformation unit, a first adjusting unit, a 3D LUT establishing unit, and a compensating unit. By the color space transformation equation plus a compensation value in advance for compensating color temperature of each gray level of the display screen, thus variation of the color temperature between low gray level and high gray level is significantly reduced and the display quality is highly promoted. Furthermore, the 3D LUT obtained by the compensated color space transformation equation can be used to compensate image parameters of pixels of a display panel so as to optimize the image performance of the display panel.

13 Claims, 7 Drawing Sheets

IMAGE PROCESSING DEVICE WITH IMAGE COMPENSATION FUNCTION AND IMAGE PROCESSING METHOD THEREOF

FIELD OF THE INVENTION

The present invention relates to an image processing device and the method thereof, particularly relates to an image processing device with image compensation function and the method thereof. By using the image processing device with image compensation function, images shown on display screen are optimized by compensating image parameters of display screen.

BACKGROUND OF THE INVENTION

With progress of science and technology development, traditional television of cathode ray tube has been replaced by liquid crystal display. Thus, liquid crystal display is popular on desktop display, personal mobile device, outdoor or indoor huge display for exhibition, and so on. However, requirement of image performance has been higher and higher by user of liquid crystal display. As a result, standards that image parameters, such as resolution, gamma curve, uniformity, color temperature and chromaticity of liquid crystal display are required to meet are gradually higher and higher.

General adjustment methods of the image parameters for liquid crystal display are to adjust individually each of the different image parameters by different adjusting circuit or algorithm. For example, 2.2 gamma curve is generally used as a main basis to adjust one gamma voltage corresponding to gray levels, while for adjusting uniformity, brightness of pixels shown on display screen is measured and compared with a default brightness so as to be adjusted according to the comparison results. However, present adjustment method of the image parameters may cause one of the image parameters to be varied along with changing other image parameters, which further raise optimization time for whole image performance.

SUMMARY OF THE INVENTION

In order to solve problems in prior arts, one of objectives is to provide an image processing device with image compensation function. By using a color space transformation equation plus a compensation value in advance, color temperature values of gray levels for an image are also compensated with the compensation value to prevent the color temperature values between dark levels and light levels from varying greatly and enhance display performance. Moreover, a 3D lookup table is further acquired by using the compensated color space transformation equation, and image parameters of pixels shown on a display screen are compensated by using the 3D lookup table. That is, each image parameter may be fine tuned based on the 3D lookup table, so that the approach saves time for adjustment on the image parameters and optimizes the image shown on the display screen.

Accordingly, an image processing device with image compensation function is provided herein, which includes: an equation establishing unit having one input terminal to receive an image signal of a display screen captured by an image capturing device, the image signal comprising a plurality of pixels and each of the pixels having chromaticity coordinates and a brightness, the equation establishing unit establishing a color space transformation equation according to the chromaticity coordinates and the brightness of the pixels, the color space transformation equation comprising transforming equations of X, Y and Z chromaticity coordinates and each of the transforming equations of X, Y and Z chromaticity coordinates respectively comprising a fixed compensation value, and the fixed compensation value for each gray level of the image signal being same; a calculating unit having one input terminal to receive the color space transformation equation from the equation establishing unit and using a fixed number of gray levels as an interval to divide the total number of gray levels of the image signal into i number of first sampling points, and reference values of the first sampling points being acquired by calculating with the color space transformation equation; a determining unit having one input terminal to receive the reference values of the first sampling points from the calculating unit and determining whether the reference values of the first sampling points are within an error range or not; a color space transformation unit having one input terminal to receive the reference values of the first sampling points from the determining unit and transforming each of the reference values of the first sampling points into a reference value of a second sampling point described with red (R), green (G) and blue (B) chromaticity coordinates; a three dimensional (3D) lookup table establishing unit having one terminal to receive the reference values of the second sampling points from the color space transformation unit and establishing a 3D lookup table according to the reference values of the second sampling points; and a compensating unit having one terminal to receive the 3D lookup table and obtaining a compensation value of an image parameter for each of the pixels with the 3D lookup table.

Accordingly, an image processing device with image compensation function is provided herein, which includes: an equation establishing unit having one input terminal to receive an image signal of a display screen captured by an image capturing device, the image signal comprising a plurality of pixels and each of the pixels having a chromaticity coordinate and a brightness, the equation establishing unit establishing a color space transformation equation according to the pixels, the color space transformation equation comprising transforming equations of X, Y and Z chromaticity coordinates and each of the transforming equations of X, Y and Z chromaticity coordinates respectively comprising a fixed compensation value, and the fixed compensation value for each gray level of the image signal being same; a calculating unit having one input terminal to receive the color space transformation equation from the equation establishing unit and using a fixed number of gray levels as an interval to divide the total number of gray levels of the image signal into i number of first sampling points, and reference values of the first sampling points being acquired by calculating with the color space transformation equation; a determining unit having one input terminal to receive the reference values of the first sampling points from the calculating unit and determining whether the reference values of the first sampling points are within an error range or not; a color space transformation unit having one input terminal to receive the reference values of the first sampling points from the determining unit and transforming each of the reference values of the first sampling points into a reference value of a second sampling point described with red (R), green (G) and blue (B) chromaticity coordinates; a first adjusting unit having one terminal coupled to the determining unit, in the case that the reference values of the first sampling points are out of the error range, the determining unit outputting the reference values of the first sampling points to the first adjusting unit to adjust the reference values of the first sampling points, and the first adjusting unit outputting the adjusted reference values of the first sampling points to the color space transformation unit; a three dimensional (3D) lookup table establishing unit having one terminal to receive the reference values of the second sampling points from the color space transformation unit and establishing a 3D lookup table according to the reference values of the second sampling points; a second adjusting unit having one input terminal coupled to the 3D lookup table establishing unit, the second adjusting unit receiving the 3D lookup table establishing unit with the one input terminal and adjusting the 3D lookup table for a user's request; and a compensating unit having one terminal to receive the 3D lookup table outputted by the second adjusting unit and obtaining a compensation value of an image parameter for each of the pixels with the 3D lookup table.

Accordingly, a method of image processing with image compensation function is provided herein, which includes: capturing an image signal of a display screen, the image signal comprising a plurality of pixels and each of the pixels having a chromaticity coordinate and a brightness; establishing a color space transformation equation according to the pixels, the color space transformation equation comprising transforming equations of X, Y and Z chromaticity coordinates and each of the transforming equations of X, Y and Z chromaticity coordinates respectively comprising a fixed compensation value, and the fixed compensation value for each gray level of the image signal being same; dividing the total number of gray levels of the image signal into i number of first sampling points by using a fixed number of gray levels as an interval and acquiring the reference values of the first sampling points by calculating with the color space transformation equation; determining whether the reference values of the first sampling points are within an error range or not; transforming each of the reference values of the first sampling points into a reference value of a second sampling point described with red (R), green (G) and blue (B) chromaticity coordinates; establishing a 3D lookup table according to the reference values of the second sampling points; adjusting the 3D lookup table for a user's request; and obtaining a compensation value of an image parameter for each of the pixels with the 3D lookup table; wherein the reference values of the first sampling points are adjusted when the reference values of the first sampling points are determined to be out of the error range.

Accordingly, by using a color space transformation equation plus a compensation value in advance, color temperature values of gray levels for an image are also compensated with the compensation value to prevent the color temperature values between dark levels and light levels from varying greatly and enhance display performance. Moreover, a 3D lookup table is further acquired by using the compensated color space transformation equation, and image parameters of pixels shown on a display screen are compensated by using the 3D lookup table. That is, each image parameter may be fine tuned based on the 3D lookup table, so that the approach saves time for adjustment on the image parameters and optimizes the image shown on the display screen.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF THE PREFERRED EMBODIMENT

The present invention relates to an image processing device with image compensation function. The fundamental meanings of algorithm, for example, linear regression method or interpolation method, used in the present invention are known for one having general knowledge in the art, so they will not be detailed described in following paragraphs. Furthermore, the presently described embodiments will be understood by reference to the drawings, and the drawings are not necessarily to scale, and the size and relative sizes of the structures and functions may have been exaggerated for clarity.

The present invention relates to an image processing device with image compensation function, and particularly relates to the one including an equation establishing unit, a calculating unit, a determining unit, a color space transformation unit, a first adjusting unit, a 3D lookup table establishing unit, a second adjusting unit and a compensating unit. By using a color space transformation equation plus a compensation value, color temperature values of gray levels for an image are compensated with the compensation value to prevent the color temperature values between dark gray levels and bright gray levels from varying greatly and enhance display performance. Moreover, a 3D lookup table is further acquired by using the compensated color space transformation equation, and image parameters of pixels shown on a display screen are compensated by using the 3D lookup table. That is, each image parameter may be fine tuned based on the 3D lookup table, so that the approach saves time for adjustment on the image parameters and optimizes the image shown on the display screen.

Figure 1:
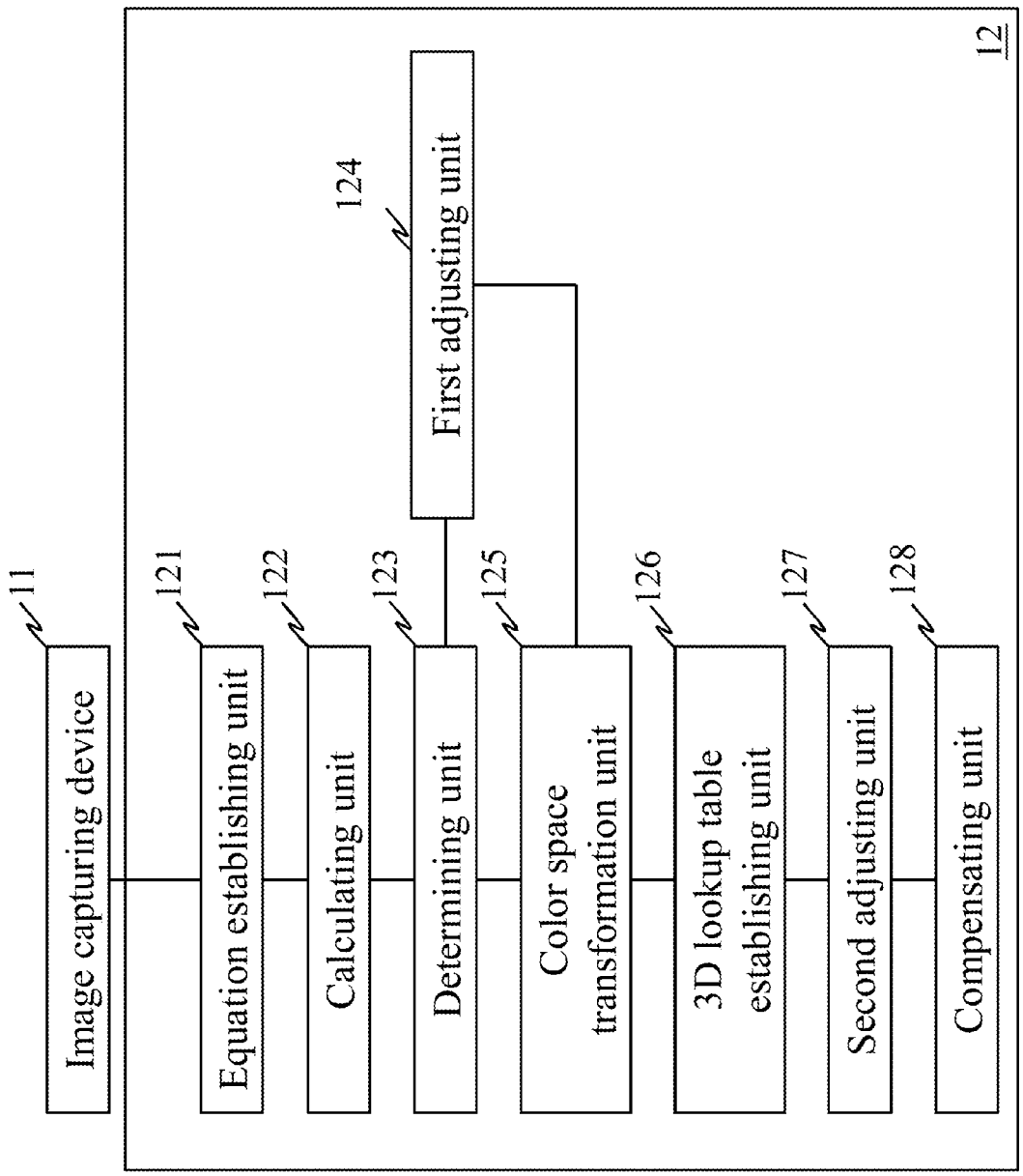
FIG. 1 is a schematic diagram illustrating an exemplary image processing device according to the present invention.
Figure 2:
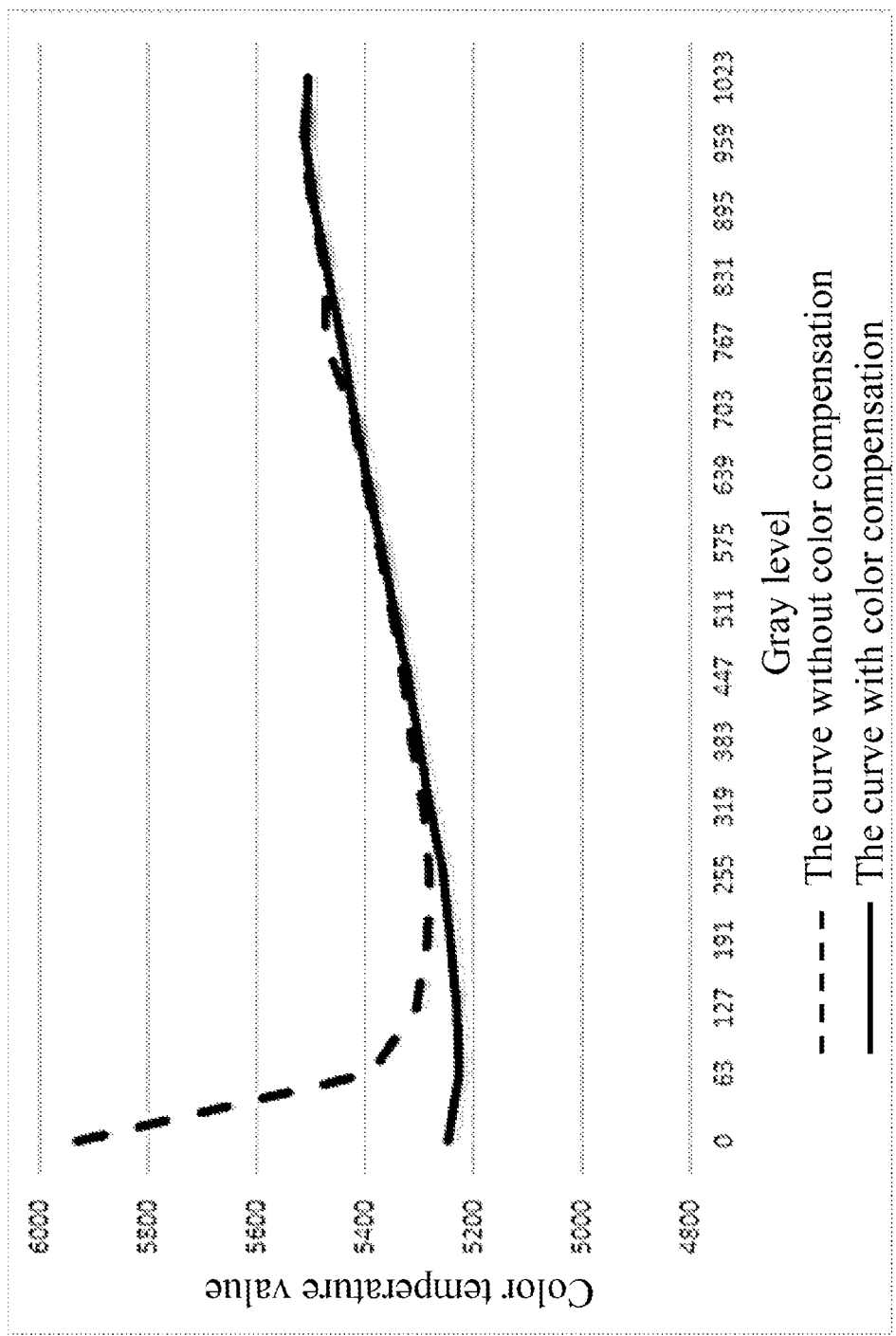
FIG. 2 is an exemplary diagram illustrating color temperature curve comparison between one example processed with color space transformation equation and another one without color temperature compensation according to the present invention.
Figure 3:
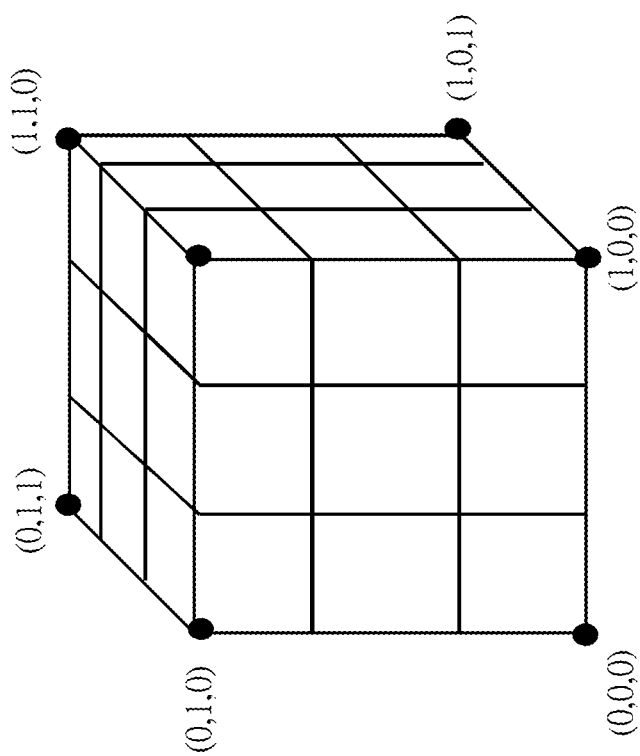
FIG. 3 is a schematic diagram illustrating a 3D LUT of one embodiment according to the present invention.

First, please refer to FIG. 1, FIG. 2 and FIG. 3. FIG. 1 is a schematic diagram illustrating an exemplary image processing device according to the present invention. FIG. 2 is an exemplary diagram illustrating color temperature curve comparison between one example processed with color space transformation equation and another one without color temperature compensation according to the present invention. FIG. 3 is a schematic diagram illustrating a 3D LUT (LookUp Table, LUT) of one embodiment according to the present invention.

Shown in FIG. 1, an image processing device 12 includes an equation establishing unit 121, a calculating unit 122, a determining unit 123, a first adjusting unit 124, a color space transformation unit 125, a 3D LUT establishing unit 126, a second adjusting unit 127, and a compensating unit 128. An image capturing device 11 captures image signal from a displaying screen, and one input terminal of the equation establishing unit 121 receives the image signal including multiple pixels, and each of pixels has chromaticity coordinates and brightness. In the meantime, the equation establishing unit 121 may establish a color space transformation equation according to the chromaticity coordinates and brightness of pixels. The color space transformation equation includes conversion equations of X, Y and Z chromaticity coordinates as following equations (1):

$$X_n = a_x + b_x(X_i - X_{i-1}) + c_x(X_i - X_{i-1})^2 + d_x(X_i - X_{i-1})^3 - C_x$$

$$Y_n = a_y + b_y(Y_i - Y_{i-1}) + c_y(Y_i - Y_{i-1})^2 + d_y(Y_i - Y_{i-1})^3 - C_y$$

$$Z_n = a_z + b_z(Z_i - Z_{i-1}) + c_z(Z_i - Z_{i-1})^2 + d_z(Z_i - Z_{i-1})^3 - C_z \quad (1)$$

where $X_n$, $Y_n$ and $Z_n$ are respectively the reference values of X, Y, and Z chromaticity coordinates for the first sampling points, $a_x$, $b_x$, $c_x$, $d_x$, $a_y$, $b_y$, $c_y$, $d_y$, $a_z$, $b_z$, $c_z$, $d_z$ are interpolating coefficients, and $C_x$, $C_y$, and $C_z$ are respectively the fixed compensation values of X, Y, and Z chromaticity coordinates. Each of the fixed compensation values $C_x$, $C_y$, and $C_z$ is the same for each gray level of the image signal. Take an example of 10 bit to drive, the fixed compensation value $C_x$ is the same for 0 to 1023 gray levels, as well as the fixed compensation values $C_y$ and $C_z$. Furthermore, the equation establishing unit 121 establishes the color space transformation equation by using a linear regression method.

Next, the equation establishing unit 121 outputs the color space transformation equation to the calculating unit 122, and one input terminal of the calculating unit 122 may receive the color space transformation equation from the equation establishing unit 121. Next, using a fixed number of gray levels as an interval, the calculating unit 122 divides the total number of gray levels of the image signal into "i" number of first sampling points. For example, provided that the fixed number of gray levels as the interval is 64, when using 10 bit to drive is to acquire total 1024 gray levels, the total 1024 gray levels are divided into 17 first sampling points where item "i" is a positive number of 1-17 in this case. The number of gray levels includes 0 to $63^{th}$ levels for the item "i" of 1~2; the number of gray levels includes $64^{th}$ to $127^{th}$ levels for the item "i" of 2~3; and the like; the number of gray levels includes $960^{th}$ to $1023^{th}$ levels for the item "i" of 16~17.

Next, the item "i" is substituted into the equation (1) to obtain the reference values of X, Y and Z chromaticity coordinates for each of the first sampling points, and the reference values of X, Y and Z chromaticity coordinates would be transformed into color temperature values. Please refer to FIG. 2, as the dash line shows, the color temperature of dark gray level is much greater than that of the bright gray level without adding the fixed compensation values $C_x$, $C_y$ and $C_z$ so as to result in distinct color temperature differences between the dark levels and the bright levels, and such distinct color temperature differences shown on a display screen would be seen by human eyes. After the addition of the fixed compensation values into the color space transformation equation, both the dark gray levels and the bright gray levels are compensated with same compensation value to greatly reduce the color temperature values of the dark gray levels, and such compensation process decreases the color temperature differences between the dark gray levels and the bright gray levels and makes a solid-line color temperature curve of total gray levels more smooth shown on FIG. 2. Consequently, the display screen with smooth changes of the color temperature of total gray levels to be seen by human eyes is more nature, color excursion can be prevented, and display performance can be enhanced.

Next, the reference values of the first sampling points may be acquired by utilizing the established color space transformation equation. The calculating unit 122 outputs the reference values of the first sampling points to the determining unit 123. The determining unit 123 receives these reference values of the first sampling points with one input terminal and then determines whether these reference values of the first sampling points are within an error range or not. Provided that any one of the reference values of the first sampling point is out of the error range, the determining unit 123 outputs the reference value of the first sampling point to the first adjusting unit 124 for adjustment. After adjusting the reference value of the first sampling point, the first adjusting unit 124 outputs the adjusted reference value of the first sampling point to the color space transformation unit 125. For example, that a difference ΔE between one of the reference values of the first sampling points and a default value is equal to or more than 2.0 is over the error range, the first adjusting unit 124 will adjust the reference value of the first sampling point to make ΔE be equal to or less than 2.0. If the difference ΔE between one of the reference values of the first sampling points and the default value is determined by the determining unit 123 to be within the error range, the determined reference value of the first sampling point would be directly outputted to the color space transformation unit 125. In this case, the determining unit 123 may be a light sensor.

Next, the color space transformation unit 125 receives the reference values of the first sampling points with one input terminal and transforms them into multitude reference values of second sampling points that are described with red (R), green (G) and blue (B) chromaticity coordinates. The second sampling points are then outputted to the 3D LUT establishing unit 126.

Next, after receiving the second sampling points, the 3D LUT establishing unit 126 will establish a 3D lookup table (LUT) according to the second sampling points. Shown in FIG. 3, the red (R), green (G) and blue (B) chromaticity coordinates are divided to acquire four nodes, respectively, and the total nodes of the 3D lookup table is 64 ($4^3$ equals to 64). Next, the 3D lookup table is outputted to the second adjusting unit 127, and the second adjusting unit 127 would adjust the 3D lookup table for user's request and then outputs the adjusted 3D lookup table to the compensating unit 128. After receiving the 3D lookup table with one input terminal, the compensating unit 128 may acquire a compensation value of image parameter for each pixel by using the 3D lookup table and optimize the images to be shown on the display screen. In the present invention, the image parameter may be, but not limited to, brightness, gamma, uniformity, color temperature or other image parameters. It is noted that the image processing device with image compensation function and its method herein provides the establishment of the 3D lookup table and the adjustment of the 3D lookup table for user's request, as well as the adjustment of the image parameters for the each pixel according to the adjusted 3D lookup table. Such a device and its method can reduce time of adjusting the image parameters.

Figure 4A:
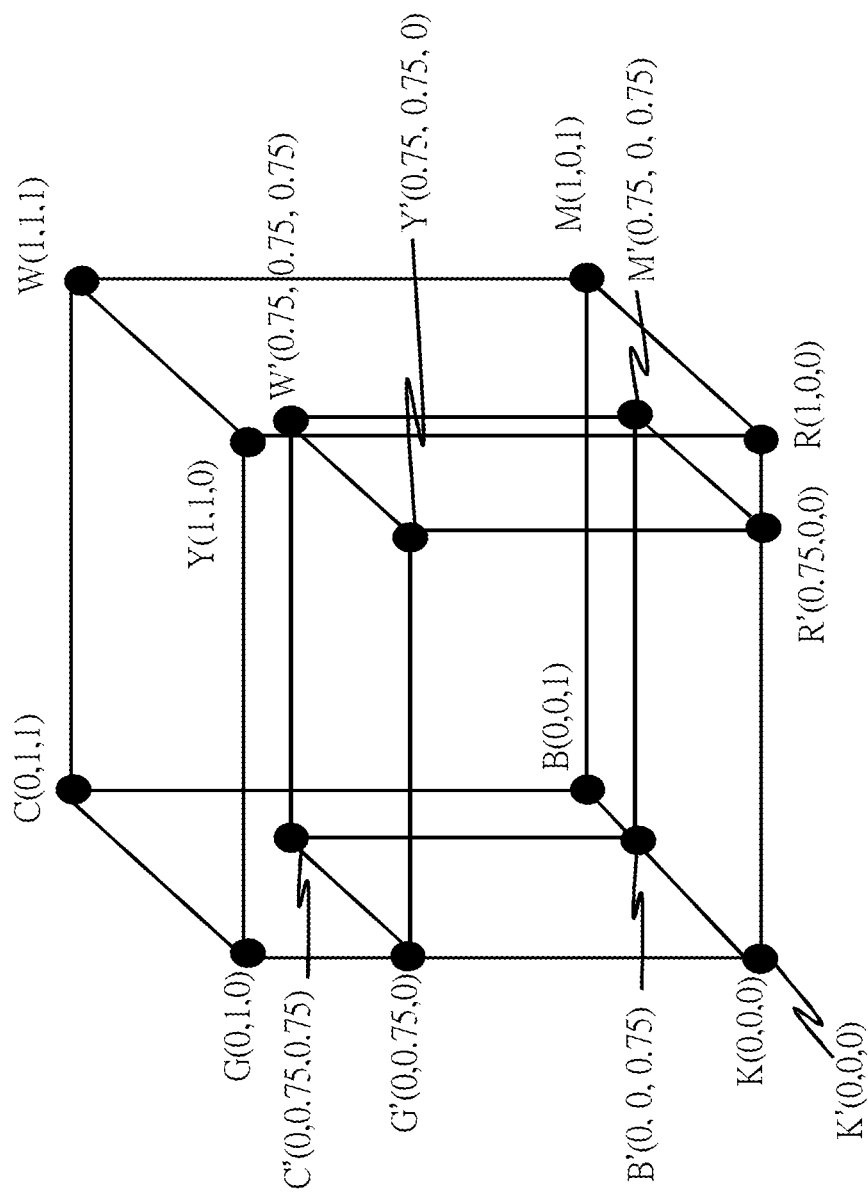
FIG. 4A is a schematic diagram illustrating the 3D LUT of one embodiment after brightness adjustment according to the present invention.

FIG. 4A is a schematic diagram illustrating the 3D LUT of one embodiment after brightness adjustment according to the present invention.

Please refer to FIG. 4A, a user would like to adjust the whole brightness of the display screen, therefore the brightness of each pixel is adjusted once more. The 3D lookup table in FIG. 3 is as a basis and adjusted once more. It is noted the red (R), green (G) and blue (B) chromaticity coordinates of the 3D lookup table are reduced in equal scale in this embodiment. For example, from the original 3D lookup table, the coordinates of eight second sampling points at ends are: C(0,1,1), W(1,1,1), M(1,0,1), R(1,0,0), K(0,0,0), G(0,1,0), Y(1,1,0) and B(0,0,1). The original 3D lookup table is reduced in 75% scale to acquire the adjusted eight second sampling points: C'(0,0.75,0.75), W'(0.75,0.75, 0.75), M'(0.75,0,0.75), R'(0.75,0,0), K'(0,0,0), G'(0,0.75,0), Y'(0.75,0.75,0) and B'(0,0,0.75) and then the adjusted 3D lookup table is acquired.

Next, each compensation value in respect of the brightness of each original pixel shown on the display screen can be acquired by using the scaled-down 3D lookup table. Both the whole brightness and the uniformity of the display screen would be adjusted by compensating the original pixels with the compensation values from the scaled-down 3D lookup table.

Figure 4B:
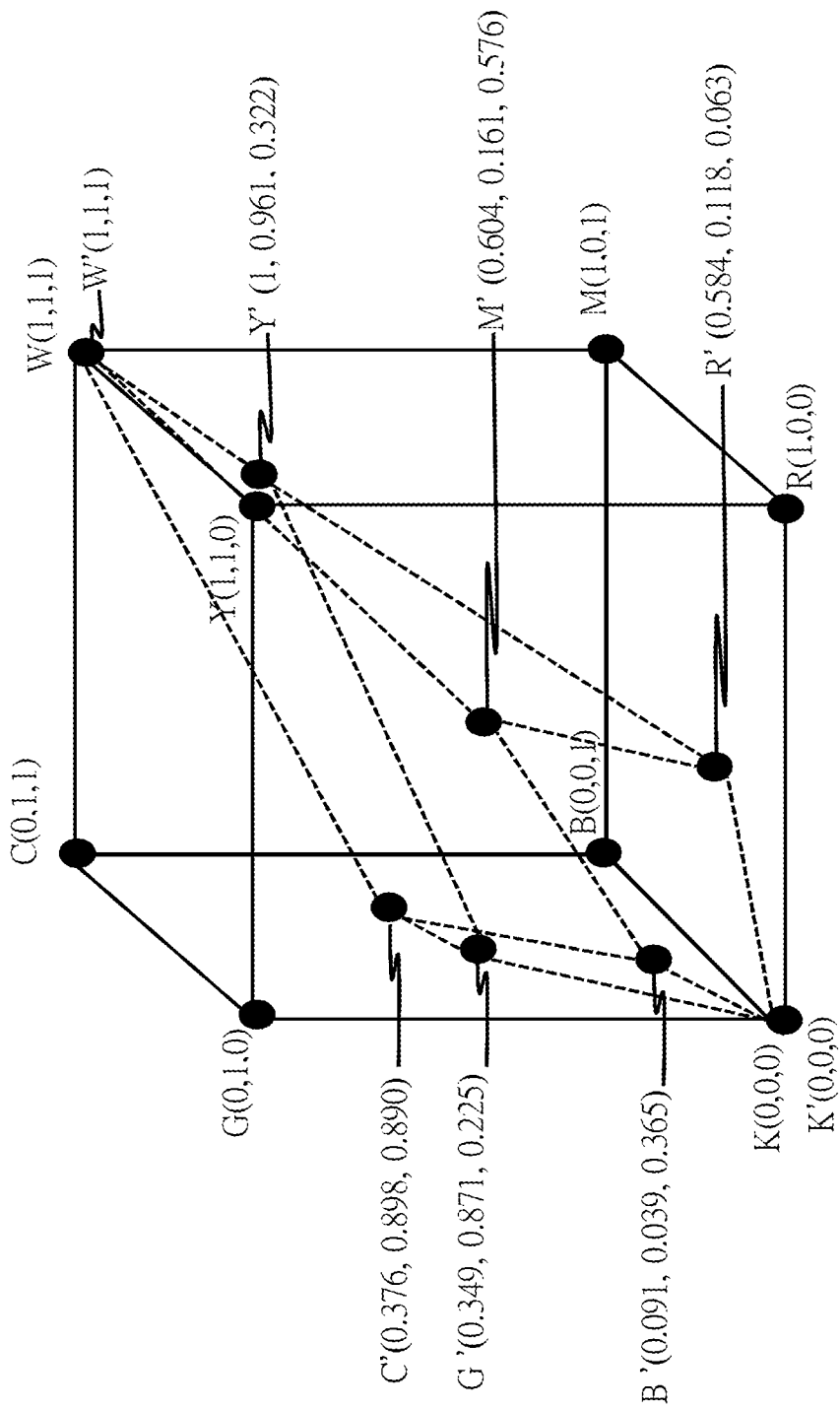
FIG. 4B is a schematic diagram illustrating the 3D LUT of one embodiment with reduction on color saturation according to the present invention.

FIG. 4B is a schematic diagram illustrating the 3D LUT of one embodiment with reduction on color saturation according to the present invention.

Shown in FIG. 4B, user would like to adjust the whole color saturation of the display screen by adjusting the chromaticity of each pixel. The 3D lookup table in FIG. 3 is as a basis, and each second sampling point of 3D lookup table is adjusted with equations as follows:

R, G, and B are transformed into L*, a*, and b* as follow:

$$\begin{bmatrix} X \\ Y \\ Z \end{bmatrix} = \begin{bmatrix} 0.412453 & 0.357580 & 0.180423 \\ 0.212671 & 0.715160 & 0.072169 \\ 0.019334 & 0.119193 & 0.950227 \end{bmatrix} \begin{bmatrix} R \\ G \\ B \end{bmatrix} \quad (2)$$

$$L^* = \begin{cases} 116 \times \left(\frac{Y}{Yn}\right)^{\frac{1}{3}} - 16, & \frac{Y}{Yn} > 0.008856 \\ 903.3 \times \frac{Y}{Yn}, & \text{otherwise} \end{cases} \quad (3)$$

$$a^* = 500 \times \left(f\left(\frac{X}{Xn}\right) - f\left(\frac{Y}{Yn}\right)\right) \quad (4)$$

$$b^* = 200 \times \left(f\left(\frac{Y}{Yn}\right) - f\left(\frac{Z}{Zn}\right)\right) \quad (5)$$

where
Xn = 0.9515
Yn = 1.0000
Zn = 1.0886

$$f(t) = \begin{cases} t^{\frac{1}{3}}, & t > 0.008856 \\ 7.787 \times t + \frac{16}{116}, & \text{otherwise} \end{cases}$$

L*, a*, and b* are transformed into R, G, and B as follow:

$$f_y = \frac{L^* + 16}{116} \quad (6)$$

$$f_x = f_y + \frac{a^*}{500}$$

$$f_z = f_y - \frac{b^*}{200}$$

if $f_y > 0.008856$ then $Y = Yn \times f_y^3$ else $Y = \left(\frac{f_y - 16}{116}\right) \times 3 \times 0.008865^2 \times Yn$ if $f_x > 0.008856$ then $X = Xn \times f_x^3$ (7)

else $X = \left(\frac{f_x - 16}{116}\right) \times 3 \times 0.008865^2 \times Xn$ if $f_z > 0.008856$ then $Z = Zn \times f_z^3$ (8)

else $Z = \left(\frac{f_z - 16}{116}\right) \times 3 \times 0.008865^2 \times Zn$ $$\begin{bmatrix} R \\ G \\ B \end{bmatrix} = \begin{bmatrix} 3.240479 & -1.537150 & -0.498535 \\ -0.969256 & 1.875992 & 0.041556 \\ 0.055648 & -0.204043 & 1.057311 \end{bmatrix} \begin{bmatrix} X \\ Y \\ X \end{bmatrix} \quad (9)$$

Please refer to FIG. 4B. In this embodiment, for example, from the original 3D lookup table, the coordinates of eight second sampling points at ends are: C(0,1,1), W(1,1,1), M(1,0,1), R(1,0,0), K(0,0,0), G(0,1,0), Y(1,1,0) and B(0,0,1). The red (R), green (G) and blue (B) chromaticity coordinates of the eight second sampling points are transformed into L*, a*, and b* by the equations (2), (3), (4) and (5). After a* and b* are multiplied by 0.5, respectively, the L*, a*, and b* are then transformed into red (R), green (G) and blue (B) chromaticity coordinates by the equations (6), (7), (8) and (9). As a result, the coordinates of the transformed eight second sampling points are C'(0.376, 0.898, 0.890), W'(1.0, 1.0, 1.0), M'(0.604, 0.161, 0.576), R'(0.584, 0.118, 0.063), K'(0.0,0.0,0.0), G'(0.349, 0.871, 0.225), Y'(1.0, 0.961, 0.322) and B'(0.091, 0.039, 0.365), respectively, and the adjustment of the 3D lookup table is achieved.

Next, each compensation value in respect of the chromaticity of each original pixel shown on the display screen can be acquired by using the color-saturation-reduced 3D lookup table. The whole color saturation of the display screen would be adjusted by compensating the original pixels with the compensation values from the color-saturation-reduced 3D lookup table.

Figure 5:
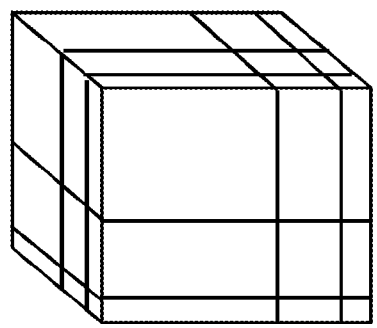
FIG. 5 is a schematic diagram illustrating a Gamma curve of one embodiment according to the present invention.
Figure 5:
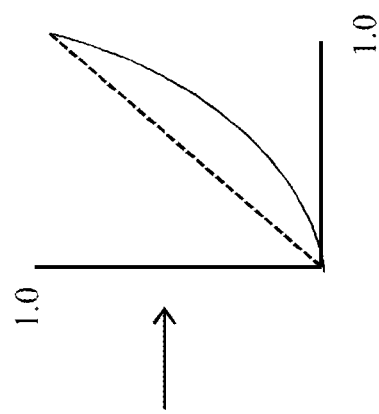
Figure 5:
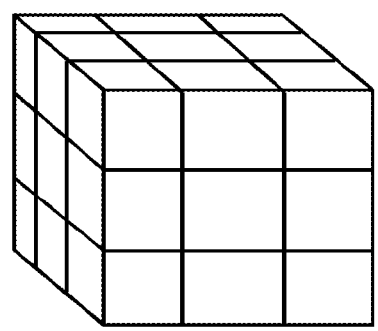
Figure 5:
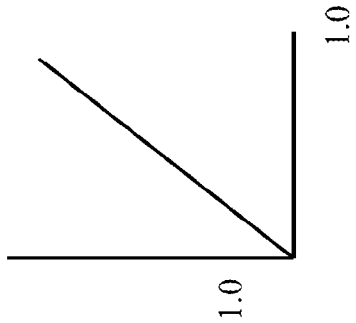

FIG. 5 is a schematic diagram illustrating a Gamma curve of one embodiment according to the present invention.

Please refer to FIG. 5, in the case that a gamma curve would like to be adjusted for the display screen, adjustment on the 3D lookup table of the gamma curve is completed and an original gamma value shown on the original display screen is assumed as γ. In order to adjust the gamma value from γ to β, the red (R), green (G) and blue (B) coordinates will be re-assigned by following equations, that is, the original 3D lookup table is adjusted by the following equations:

$$\begin{cases} R = R'^{\left(\frac{\beta}{\gamma}\right)} & (R' = n_r/m \text{ where } n_r = 0, 1, 2, \ldots, m) \\ G = G'^{\left(\frac{\beta}{\gamma}\right)} & (G' = n_g/m \text{ where } n_g = 0, 1, 2, \ldots, m) \\ B = B'^{\left(\frac{\beta}{\gamma}\right)} & (B' = n_b/m \text{ where } n_b = 0, 1, 2, \ldots, m) \end{cases}$$

For example, for the display screen of 10 bit color bit depth, the whole 3D lookup table is a cubic of 1024*1024*1024, and item "m" is equal to 1023. Coordinates R', G' and B' from the 3D lookup table are inputted in sequence into the aforementioned equations to acquire the coordinates of one pixel corresponding to the original 3D lookup table. The coordinates of the one pixel corresponding to the original 3D lookup table are applied onto a new 3D lookup table to obtain an adjusted gamma curve. The left part of FIG. 5 represents the original gamma curve and the original 3D lookup table, and the right part of FIG. 5 represents the adjusted gamma curve and the adjusted 3D lookup table that is compared with the original 3D lookup table. In FIG. 5, the original gamma curve is an inclined straight line, and the adjusted gamma curve is a quadratic curve.

Figure 6:
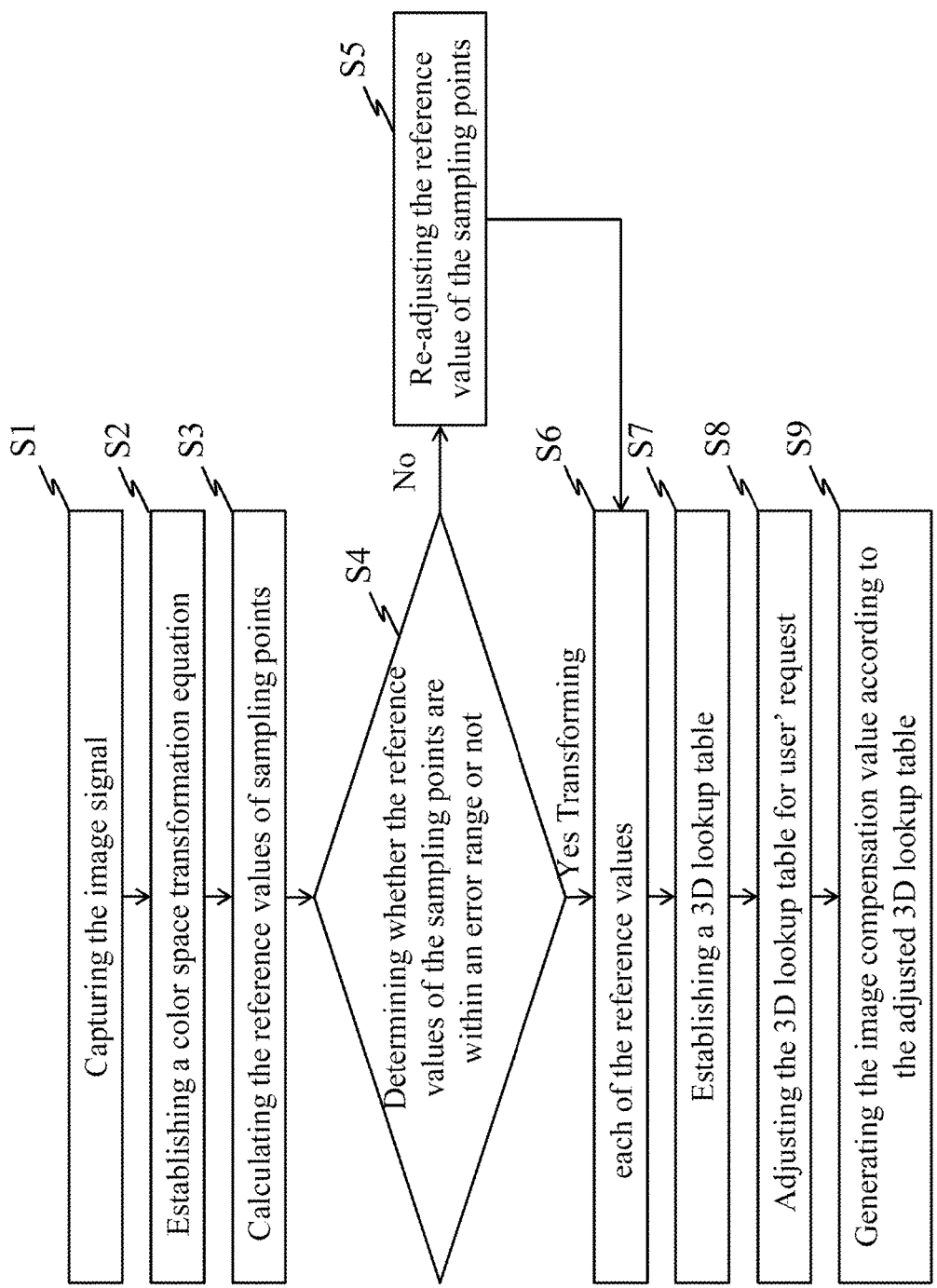
FIG. 6 is a schematic diagram illustrating a flow chart of an exemplary image process according to the present invention.

Finally, please refer to FIG. 6. FIG. 6 is a schematic diagram illustrating a flow chart of an exemplary image process according to the present invention, and the flow chart includes steps as follows.

Step S1: the image capturing device 11 captures the image signal of the display screen to be adjusted. The image signal includes a plurality of pixels, and each of that has chromaticity coordinates and brightness. Next, go to Step S2.

Step S2: the equation establishing unit 121 establishes a color space transformation equation in respect of the pixels. The color space transformation equation includes transformation equations of X, Y and Z chromaticity coordinates. Each of the transformation equations of X, Y and Z chromaticity coordinates includes a fixed compensation value that is the same for each gray level of the image signal. Next, go to Step S3.

Step S3: by using a fixed number of gray levels as an interval, the total number of gray levels of the image signal are divided into "i" number of first sampling points, and reference values of the first sampling points are acquired by calculating with the color space transformation equation. Next, go to Step S4.

Step S4: the determining unit 123 determines whether these reference values of the first sampling points are within an error range or not. Provided that the determining unit 123 determines any one of the reference values of the first sampling point out of the error range, go to Step S5 to adjust the reference value of the first sampling point by the first adjusting unit 124. After adjusting the reference value of the first sampling point, go to Step S6. On the other hand, provided that the determining unit 123 determines any one of the reference values of the first sampling point within the error range, go to Step S6.

Step S6: the color space transformation unit 125 transforms each of the reference values of the first sampling points into the reference values of the second sampling points that are described with the red (R), green (G) and blue (B) coordinates.

Step S7: the 3D LUT establishing unit 126 establishes a 3D lookup table according to the reference values of these second sampling points, and then go to Step S8.

Step S8: the second adjusting unit 127 adjusts the 3D lookup table for user's request, and then go to Step S9.

Step S9: the compensating unit 128 generates compensation values of image parameters for the each pixel according to the adjusted 3D lookup table.

Accordingly, in the case of brightness or temperature of the display screen under environment changing, the image processing device with image compensation and the method thereof of the present invention may further provide the display screen with equipping brightness sensor or temperature sensor to capture the image signal by the image capturing device, determine whether great differences exist between the image parameters of the image signal and the one of the adjusted image signal or not, and re-establish 3D lookup table by executing the process mentioned in the embodiments for adjustment of the image parameters if the great differences exist.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An image processing device with image compensation function, comprising:
   an equation establishing unit having one input terminal to receive an image signal of a display screen captured by an image capturing device, the image signal comprising a plurality of pixels and each of the pixels having chromaticity coordinates and a brightness, the equation establishing unit establishing a color space transformation equation according to the chromaticity coordinates and the brightness of the pixels, the color space transformation equation comprising transforming equations of X, Y and Z chromaticity coordinates and each of the transforming equations of X, Y and Z chromaticity coordinates respectively comprising a fixed compensation value, and the fixed compensation value for each gray level of the image signal being the same;
   a calculating unit having one input terminal to receive the color space transformation equation from the equation establishing unit and using a fixed number of gray levels as an interval to divide the total number of gray levels of the image signal into i number of first sampling points, and reference values of the first sampling points being acquired by calculating with the color space transformation equation;
   a determining unit having one input terminal to receive the reference values of the first sampling points from the calculating unit and determining whether the reference values of the first sampling points are within an error range or not;
   a color space transformation unit having one input terminal to receive the reference values of the first sampling points from the determining unit and transforming each of the reference values of the first sampling points into a reference value of a second sampling point described with red (R), green (G) and blue (B) chromaticity coordinates;
   a three dimensional (3D) lookup table establishing unit having one terminal to receive the reference values of the second sampling points from the color space transformation unit and establishing a 3D lookup table according to the reference values of the second sampling points; and
   a compensating unit having one terminal to receive the 3D lookup table and obtaining a compensation value of an image parameter for each of the pixels with the 3D lookup table.

2. The image processing device with image compensation function of claim 1, further comprising a first adjusting unit having one input terminal coupled to the determining unit, wherein in the case that the reference values of the first sampling points are out of the error range, the determining unit outputs the reference values of the first sampling points to the first adjusting unit to adjust the reference values of the first sampling points, and the first adjusting unit outputs the adjusted reference values of the first sampling points to the color space transformation unit.

3. The image processing device with image compensation function of claim 1, further comprising a second adjusting unit having one input terminal coupled to the 3D lookup table establishing unit, wherein the second adjusting unit receives the 3D lookup table establishing unit with the one input terminal, adjusts the 3D lookup table for a user's request and outputs the adjusted 3D lookup table.

4. The image processing device with image compensation function of claim 1, wherein the equation establishing unit establishes the color space transformation equation by using a linear regression method.

5. The image processing device with image compensation function of claim 1, wherein the color space transformation equation is represented as:

$$X_n=a_x+b_x(X_i-X_{i-1})+c_x(X_i-X_{i-1})^2+d_x(X_i-X_{i-1})^3-C_x$$

$$Y_n=a_y+b_y(Y_i-Y_{i-1})+c_y(Y_i-Y_{i-1})^2+d_y(Y_i-Y_{i-1})^3-C_y$$

$$Z_n=a_z+b_z(Z_i-Z_{i-1})+c_z(Z_i-Z_{i-1})^2+d_z(Z_i-Z_{i-1})^3-C_z$$

where $X_n$, $Y_n$ and $Z_n$ are respectively the reference values of X, Y, and Z chromaticity coordinates for the first sampling points, $a_x$, $b_x$, $c_x$, $d_x$, $a_y$, $b_y$, $c_y$, $d_y$, $a_z$, $b_z$, $c_z$, $d_z$ are interpolating coefficients, and $C_x$, $C_y$ and $C_z$ are respectively the fixed compensation values of X, Y, and Z chromaticity coordinates.

6. The image processing device with image compensation function of claim 1, wherein the determining unit is a light sensor.

7. An image processing device with image compensation function, comprising:

an equation establishing unit having one input terminal to receive an image signal of a display screen captured by an image capturing device, the image signal comprising a plurality of pixels and each of the pixels having chromaticity coordinates and a brightness, the equation establishing unit establishing a color space transformation equation according to the pixels, the color space transformation equation comprising transforming equations of X, Y and Z chromaticity coordinates and each of the transforming equations of X, Y and Z chromaticity coordinates respectively comprising a fixed compensation value, and the fixed compensation value for each gray level of the image signal being same;

a calculating unit having one input terminal to receive the color space transformation equation from the equation establishing unit and using a fixed number of gray levels as an interval to divide the total number of gray levels of the image signal into i number of first sampling points, and reference values of the first sampling points being acquired by calculating with the color space transformation equation;

a determining unit having one input terminal to receive the reference values of the first sampling points from the calculating unit and determining whether the reference values of the first sampling points are within an error range or not;

a color space transformation unit having one input terminal to receive the reference values of the first sampling points from the determining unit and transforming each of the reference values of the first sampling points into a reference value of a second sampling point described with red (R), green (G) and blue (B) chromaticity coordinates;

a first adjusting unit having one terminal coupled to the determining unit, in the case that the reference values of the first sampling points are out of the error range, the determining unit outputting the reference values of the first sampling points to the first adjusting unit to adjust the reference values of the first sampling points, and the first adjusting unit outputting the adjusted reference values of the first sampling points to the color space transformation unit;

a three dimensional (3D) lookup table establishing unit having one terminal to receive the reference values of the second sampling points from the color space transformation unit and establishing a 3D lookup table according to the reference values of the second sampling points;

a second adjusting unit having one input terminal coupled to the 3D lookup table establishing unit, the second adjusting unit receiving the 3D lookup table establishing unit with the one input terminal and adjusting the 3D lookup table for a user's request; and a compensating unit having one terminal to receive the 3D lookup table outputted by the second adjusting unit and obtaining a compensation value of an image parameter for each of the pixels with the 3D lookup table.

8. The image processing device with image compensation function of claim 7, wherein the equation establishing unit establishes the color space transformation equation by utilizing a linear regression method.

9. The image processing device with image compensation function of claim 7, wherein the color space transformation equation is represented as:

$$X_n=a_x+b_x(X_i-X_{i-1})+c_x(X_i-X_{i-1})^2+d_x(X_i-X_{i-1})^3-C_x$$

$$Y_n=a_y+b_y(Y_i-Y_{i-1})+c_y(Y_i-Y_{i-1})^2+d_y(Y_i-Y_{i-1})^3-C_y$$

$$Z_n=a_z+b_z(Z_i-Z_{i-1})+c_z(Z_i-Z_{i-1})^2+d_z(Z_i-Z_{i-1})^3-C_z$$

where $X_n$, $Y_n$ and $Z_n$ are respectively the reference values of X, Y, and Z chromaticity coordinates for the first sampling points, $a_x$, $b_x$, $c_x$, $d_x$, $a_y$, $b_y$, $c_y$, $d_y$, $a_z$, $b_z$, $c_z$, $d_z$ are interpolating coefficients, and $C_x$, $C_y$ and $C_z$ are respectively the fixed compensation values of X, Y, and Z chromaticity coordinates.

10. The image processing device with image compensation function of claim 7, wherein the determining unit is a light sensor.

11. A method of image processing with image compensation function, comprising:

capturing an image signal of a display screen, the image signal comprising a plurality of pixels and each of the pixels having chromaticity coordinates and a brightness;

establishing a color space transformation equation according to the pixels, the color space transformation equation comprising transforming equations of X, Y and Z chromaticity coordinates and each of the transforming equations of X, Y and Z chromaticity coordinates respectively comprising a fixed compensation value, and the fixed compensation value for each gray level of the image signal being the same;

dividing the total number of gray levels of the image signal into i number of first sampling points by using a fixed number of gray levels as an interval and acquiring the reference values of the first sampling points by calculating with the color space transformation equation;

determining whether the reference values of the first sampling points are within an error range or not;

transforming each of the reference values of the first sampling points into a reference value of a second sampling point described with red (R), green (G) and blue (B) chromaticity coordinates;

establishing a 3D lookup table according to the reference values of the second sampling points;

adjusting the 3D lookup table for a user's request; and obtaining a compensation value of an image parameter for each of the pixels with the 3D lookup table; wherein the reference values of the first sampling points are adjusted when the reference values of the first sampling points are determined to be out of the error range.

12. The method of image processing with image compensation function of claim 11, wherein the step of establishing a color space transformation equation is implemented by utilizing a linear regression method.

13. The method of image processing with image compensation function of claim 11, wherein the color space transformation equation is represented as:

$$X_n = a_x + b_x(X_i - X_{i-1}) + c_x(X_i - X_{i-1})^2 + d_x(X_i - X_{i-1})^3 - C_x$$

$$Y_n = a_y + b_y(Y_i - Y_{i-1}) + c_y(Y_i - Y_{i-1})^2 + d_y(Y_i - Y_{i-1})^3 - C_y$$

$$Z_n = a_z + b_z(Z_i - Z_{i-1}) + c_z(Z_i - Z_{i-1})^2 + d_z(Z_i - Z_{i-1})^3 - C_z$$

where $X_n$, $Y_n$ and $Z_n$ are respectively the reference values of X, Y, and Z chromaticity coordinates for the first sampling points, $a_x$, $b_x$, $c_x$, $d_x$, $a_y$, $b_y$, $c_y$, $d_y$, $a_z$, $b_z$, $c_z$, $d_z$ are interpolating coefficients, and $C_x$, $C_y$ and $C_z$ are respectively the fixed compensation values of X, Y, and Z chromaticity coordinates.

\* \* \* \* \*